(12) United States Patent
Kobayashi et al.

(10) Patent No.: US 7,436,121 B2
(45) Date of Patent: Oct. 14, 2008

(54) LIGHT SOURCE DEVICE

(75) Inventors: Yuichi Kobayashi, Himeji (JP); Takashi Yamashita, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 533 days.

(21) Appl. No.: 11/133,199

(22) Filed: May 20, 2005

(65) Prior Publication Data
US 2005/0269925 A1    Dec. 8, 2005

(30) Foreign Application Priority Data
Jun. 7, 2004 (JP) ............................. 2004-168296

(51) Int. Cl.
*H05B 39/04* (2006.01)
*H01J 5/16* (2006.01)
(52) U.S. Cl. .................... 315/104; 313/112; 313/571
(58) Field of Classification Search ................ 315/101, 315/104–107, 114, 115, 246, 291; 313/15, 313/110–113, 571, 634, 639
See application file for complete search history.

(56) References Cited

U.S. PATENT DOCUMENTS

| | | | |
|---|---|---|---|
| 4,386,292 A * | 5/1983 | Rothwell et al. ............ 313/112 |
| 4,461,973 A | 7/1984 | Kaufman et al. | |
| 4,467,238 A | 8/1984 | Silverstein et al. | |
| 4,678,960 A | 7/1987 | Reiling | |
| 5,016,152 A * | 5/1991 | Awai et al. ................... 362/293 |
| 5,109,181 A | 4/1992 | Fischer et al. ............... 313/634 |
| 5,497,049 A | 3/1996 | Fischer ........................ 313/571 |
| 6,211,616 B1 * | 4/2001 | Takeuti et al. ............... 313/637 |
| 6,597,118 B2 * | 7/2003 | Arimoto et al. ............. 315/115 |

FOREIGN PATENT DOCUMENTS

GB    1558016 A    12/1979

OTHER PUBLICATIONS

European Search Report dated Jan. 14, 2008 for EP 05 01 0855.

* cited by examiner

*Primary Examiner*—Douglas W. Owens
*Assistant Examiner*—Jimmy T Vu
(74) *Attorney, Agent, or Firm*—David S. Safran (57) ABSTRACT

A light source device for a projector device having a discharge lamp with a silica glass discharge vessel containing a pair of opposed electrodes and at least 0.15 mg/mm$^3$ of mercury, a concave reflector which surrounds the discharge lamp and reflects light emitted from the discharge lamp in a given direction, and a power supply device which selectively supplies a first wattage and a lower second wattage, is provided with a reflection heating arrangement which, in operation of the discharge lamp with the lower second wattage, returns at least part of the light emitted by the discharge lamp in the direction of the discharge lamp, and in operation of the discharge lamp at the first, higher wattage returns less light than in operation with the second wattage in the direction of the discharge lamp.

15 Claims, 9 Drawing Sheets

LIGHT SOURCE DEVICE

BACKGROUND OF THE INVENTION

1. Field of the Invention

The invention relates to a light source device, especially to a light source device which is used for the optical system of a projector device using liquid crystals and a DMD device (D(igital) M(icro mirror) D(evice)).

2. Description of the Prior Art

Recently, there has been a great demand for prolonging the service life of a projector device and making it smaller. There is also a demand for increasing the radiance of the discharge lamp as the light source. As the light source, a discharge lamp is suggested in which, by an increased mercury vapor pressure, the broadening of the arc is suppressed (the arc is compressed) and a distinct increase of radiance is enabled. This discharge lamp is disclosed, for example, in JP-A-2-148561 (corresponding to U.S. Pat. No. 5,109,181) and JP-A-6-52830 (corresponding to U.S. Pat. No. 5,497,049).

However, if the mercury density within the arc tube is increased, there are cases in which due to the occurrence of a small temperature change within the arc tube unstable behavior repeatedly occurs, in which the added mercury in the area with a low temperature does not vaporize to some extent and afterwards the unvaporized mercury vaporizes. The repetition of this unstable behavior makes the emission of the discharge lamp unstable. In particular, due to the sudden vaporization of the unvaporized mercury, the emission of the discharge lamp instantaneously becomes unstable, by which the so-called flicker phenomenon occurs in a projector device.

On the other hand, in the operation of a projector device, in addition to use in operation with normal radiance (steady-state operating mode), there is also a demand for power-saving operation (economy mode) with reduced operating wattage of the discharge lamp. Specifically, there is a case in which it is preferred that the projected images of the projector device be viewed as darker images, and a case in which it is preferred that the projector device be used with a lower noise burden with reduced rpm of the air cooling fan. Since this case is accompanied by a reduction of the operating wattage of the discharge lamp, the formation of the above described unvaporized mercury is further accelerated as a result.

Even if the lamp can be built such that the mercury can completely vaporize in the economy mode a problem still would exist. That is, in the steady-state operating mode, excessive increases in the temperature of the lamp occurs, resulting in the disadvantages of devitrification of the discharge vessel and the like.

Furthermore, if the device can be built such that, by arrangement of a cooling device in which the cooling capacity can be regulated within a wide range (for example, by the arrangement of a cooling fan), in the economy mode, the mercury is caused to completely vaporize and that, in the steady-state operating mode, an excess temperature increase is avoided, the provision of the fan would itself be problematic. That is, since in a projector device there is a demand for making it smaller (for example, B5 size) and lighter in weight (for example, roughly 1500 g), the provision of such a large cooling device is not practical.

Therefore, even in a projector device provided with an economy mode, in practice, the operating wattage cannot be regulated in a wide range. The genuine state of affairs is that, for example, in a discharge lamp with a rated output of 200 W, a wattage reduction to at most roughly 80% (operating wattage of 160 W) can be accomplished.

The same disadvantage can occur in the case in which the wattage is changed not only in the classification of the steady-state operating mode and the economy mode, but also in the steady-state operating mode.

SUMMARY OF THE INVENTION

A primary object of the invention is to devise an arrangement for a light source device of a projector device which can be used both with a high wattage operating mode (steady-state operating mode) and also with a low wattage operating mode (economy mode), in which the added mercury can be essentially completely vaporized in each of the two modes and in which an undue temperature increase can be avoided.

The above described object is achieved in accordance with the invention in a light source device which comprises the following:

a discharge lamp in which a pair of opposed electrodes and an amount of mercury of at least 0.15 mg/mm$^3$ are contained within a silica glass discharge vessel;

a concave reflector which surrounds the discharge lamp and which reflects the light emitted from this discharge lamp in a given direction; and a power supply device which is made to supply wattage for a high wattage operating mode and wattage for a low wattage operating mode by corresponding switching of the discharge lamp, and a reflection heating means which, in operation of the discharge lamp with the second lower wattage, returns at least part of the light emitted by the discharge lamp in the direction of the discharge lamp, and in operation of the discharge lamp at the first, higher wattage, returns less light than in operation with the second wattage in the direction of the discharge lamp.

Operation of the discharge lamp with the first wattage is also called the high wattage operating mode below, and operation with the second wattage is called the low wattage operating mode or economy mode.

In particular, the reflection heating means is preferably made such that it returns the UV radiation and/or infrared radiation emitted from the discharge lamp to the discharge lamp. Moreover, the reflection heating means is preferably made such that, in the high wattage operating mode, it returns essentially no radiation to the discharge lamp.

Advantages

In the light source device of the invention, the reflection heating means is used differently, specifically, depending on the high wattage operating mode and the low wattage operating mode. In the high wattage operating mode, the infrared light emitted from the discharge lamp or the UV radiation emitted from the discharge lamp is reflected less than in the low wattage operating mode and preferably is not reflected at all back to the discharge lamp. Therefore, heating of the discharge lamp can be suppressed.

In the low wattage operating mode, because the infrared light emitted by the discharge lamp or the UV radiation emitted by the discharge lamp is returned to the discharge lamp, the discharge lamp can be subjected to radiant heating. Even when the wattage which is supplied by the power supply device to the discharge lamp is reduced, the mercury can advantageously by vaporized. In this way, low wattage operation with distinctly reduced wattage is enabled. For example, an operating wattage with roughly 50% of the steady-state operating mode can be achieved.

The invention is further described below with reference to the accompanying drawings.

DETAILED DESCRIPTION OF THE INVENTION

Figure 1:
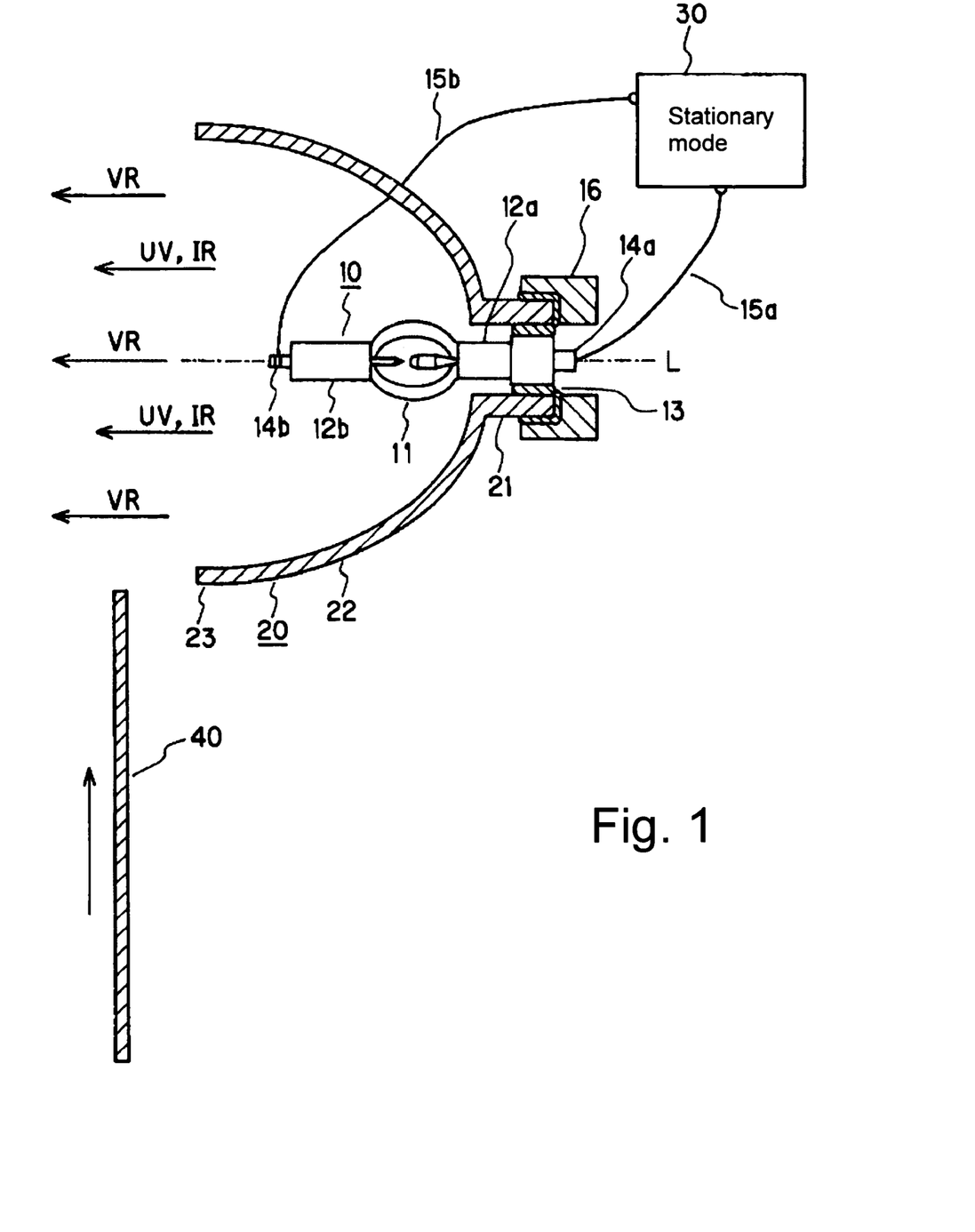
FIG. 1 is a schematic view of a light source device in accordance with the invention in the high wattage operating mode.
Figure 2:
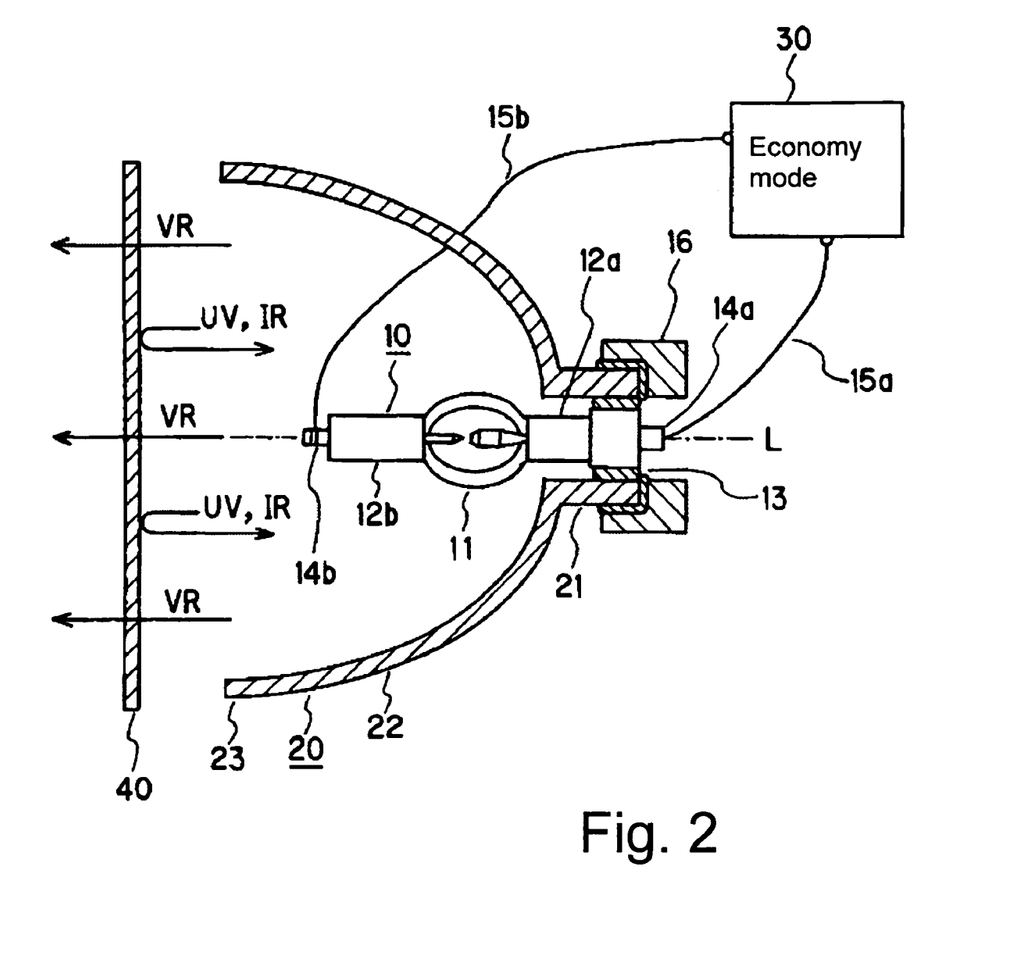
FIG. 2 is a schematic view of the light source device from FIG. 1 in the low wattage operating mode.

FIGS. 1 and 2 show a light source device in accordance with a first embodiment of the invention. FIG. 1 shows the arrangement in the high wattage operating mode. FIG. 2 shows the arrangement in the low wattage operating mode. In the embodiments described below, a steady-state operating mode is described as a specific example of the high wattage operating mode and the economy mode is described as a specific example of the low wattage operating mode.

The light source device comprises a discharge lamp 10, a concave reflector 20 which surrounds the discharge lamp 10, a power supply device 30 which supplies power to the discharge lamp 10, and a reflection heating means 40.

The two drawings differ from one another only by the positions of the reflection heating means 40. The arrangements of the discharge lamp 10 and of the concave reflector 20 are basically identical in the two drawings.

The discharge lamp 10 is a so-called ultra-high pressure mercury lamp of the short arc type which has an essentially spherical light emitting part 11 and hermetically sealed portions 12a, 12b which are present on the two ends of the light emitting part 11 and are rod-shaped. The inside of the light emitting part 11 constitutes an emission space in which there is a pair of opposed electrodes.

The hermetically sealed portion 12a is inserted into the opening of the neck part 21 of the concave reflector 20. A base which is attached to the tip of the hermetically sealed portion 12a is mounted in the neck part 21 by way of a cement 13. Power supply leads 14a, 14b project from the ends of the hermetically sealed portions 12a, 12b, to which a power supply device 30 is electrically connected via supply lines 15a, 15b.

On the neck part 21 of the concave reflector 20, there is a holding component 16 which, for example, is made of a ceramic material or the like. The concave reflector 20 is mounted with a cement in the holding component 16.

The concave reflector 20 is an oval focusing mirror which is essentially dome-shaped overall with a neck part 21, a reflection part 22 and a front opening part 23. On the inside of the reflection part 22, layers are formed for reflection of visible radiation, in which, for example, titanium and silicon oxide are layered in alternation and which have the function of reflection of light in a desired visible wavelength range. The discharge lamp 10 is arranged such that the arc direction essentially agrees with the optical axis L of the concave reflector 20. The arc spot of the discharge lamp 10 agrees with the first focal point of the concave reflector 20.

The discharge lamp 10 operates selectively with a steady-state operating mode or an economy mode by a corresponding wattage being supplied by the power supply device 30. The steady-state operating mode is normal operation and means a state in which the discharge lamp 10 is operated brightly. The economy mode means a mode in which the discharge lamp is operating somewhat more dimly by an operating wattage from 50 to 90% of the steady-state operating mode. The discharge lamp is operated, for example, in the steady-state operating mode with 200 W and 2.5 A and in the economy mode with 100 W and 1.25 A.

In the vicinity of the front opening part 23 of the concave reflector 20, there is a reflection heating means 40, for example, made of plate glass. This reflection heating means 40 reflects light in the infrared wavelength range (IR) and light in the ultraviolet wavelength range (UV) and has the property of transmitting light in the visible wavelength range (VR).

In the steady-state operating mode which is shown in FIG. 1, the reflection heating means 40 is removed from the front opening part 23, yielding an arrangement in which the light reflected from the discharge lamp 10 has no effect on the reflection heating means 40. On the other hand, in the economy mode which is shown in FIG. 2, the reflection heating means 40 is arranged such that the front opening part 23 is almost closed and the light reflected from the discharge lamp 10 is projected directly onto the reflection heating means 40.

Therefore, in the steady-state operating mode not only light in the visible wavelength range (VR), but also light in the infrared wavelength range (IR) and light in the UV wavelength range (UV) are emitted from the light source device. Conversely, in the economy mode, light in the infrared wavelength range (IR) and light in the UV wavelength range (UV) are reflected by the reflection heating means 40, and therefore, are not emitted from the light source device.

Here, the expression "light in the visible wavelength range" (hereinafter also called visible radiation) is defined as light with wavelengths from 360 to 780 nm which is the light necessary for a light source of a projector device. The expression "light in the infrared wavelength range" (hereinafter also called infrared light) is defined as light with wavelengths longer than 780 nm. The expression "light in the UV wavelength range" (hereinafter also called UV light) is defined as light with wavelengths shorter than 360 nm. Infrared radiation and UV radiation are light in wavelength ranges which are not necessary for purposes of projection of images by a projector device.

The reflection heating means 40, for example, because it is provided with a multilayer film which was formed by vapor deposition, transmits visible light and reflects IR light and UV radiation.

The reflection of infrared light (IR), UV radiation (UV) or both types of radiation jointly in the direction of the discharge lamp 10 in the economy mode subjects the discharge lamp to radiant heating. In this way, the mercury contained in the discharge lamp can also completely vaporize in the state in which the wattage supplied by the power supply device is low.

In the steady-state operating mode, as much as possible, neither the infrared light (IR) nor the UV radiation (UV) is reflected in the direction of the discharge lamp 10, so that the temperature increase of the discharge lamp is suppressed.

In addition to the above described circumstances, for the light source device in accordance with the invention, on the one hand, there is a demand for reducing as much as possible the overall dimensions while, on the other hand, there is a demand for a large amount of radiant light. The thermal conditions in the light emitting part of the discharge lamp are therefore extremely strict, as is shown using an example of a wall load of 0.8 $W/mm^2$ to 2.0 $W/mm^2$. The reason for this is that the discharge lamp is designed for the steady-state operating mode under thermal conditions which are near the load bearing capacity, and that, therefore, the infrared light (IR) or UV radiation (UV) can accelerate heating.

The reflection heating means 40 slides using a driving device which is not shown in the drawings. This driving device reacts to the reception of signals about the operating modes of the feed device. Specifically, the reflection heating means 40 is arranged such that the reflector is covered when the power supply device 30 supplies a wattage to the discharge lamp which corresponds to the economy mode. When the power supply device 30 supplies a wattage to the discharge lamp which corresponds to the steady-state operating mode, the reflection heating means 40 is slid to a position at which it is removed from the reflector opening. The power supply device 30, of course, receives this information from the main part of the projector device. The direction in which the reflection heating means 40 slides (position at which in the steady-state operating mode it is removed) is not especially limited, but it can be designed in a suitable manner in conjunction with the parts and the like which are located in the vicinity.

Figure 3:
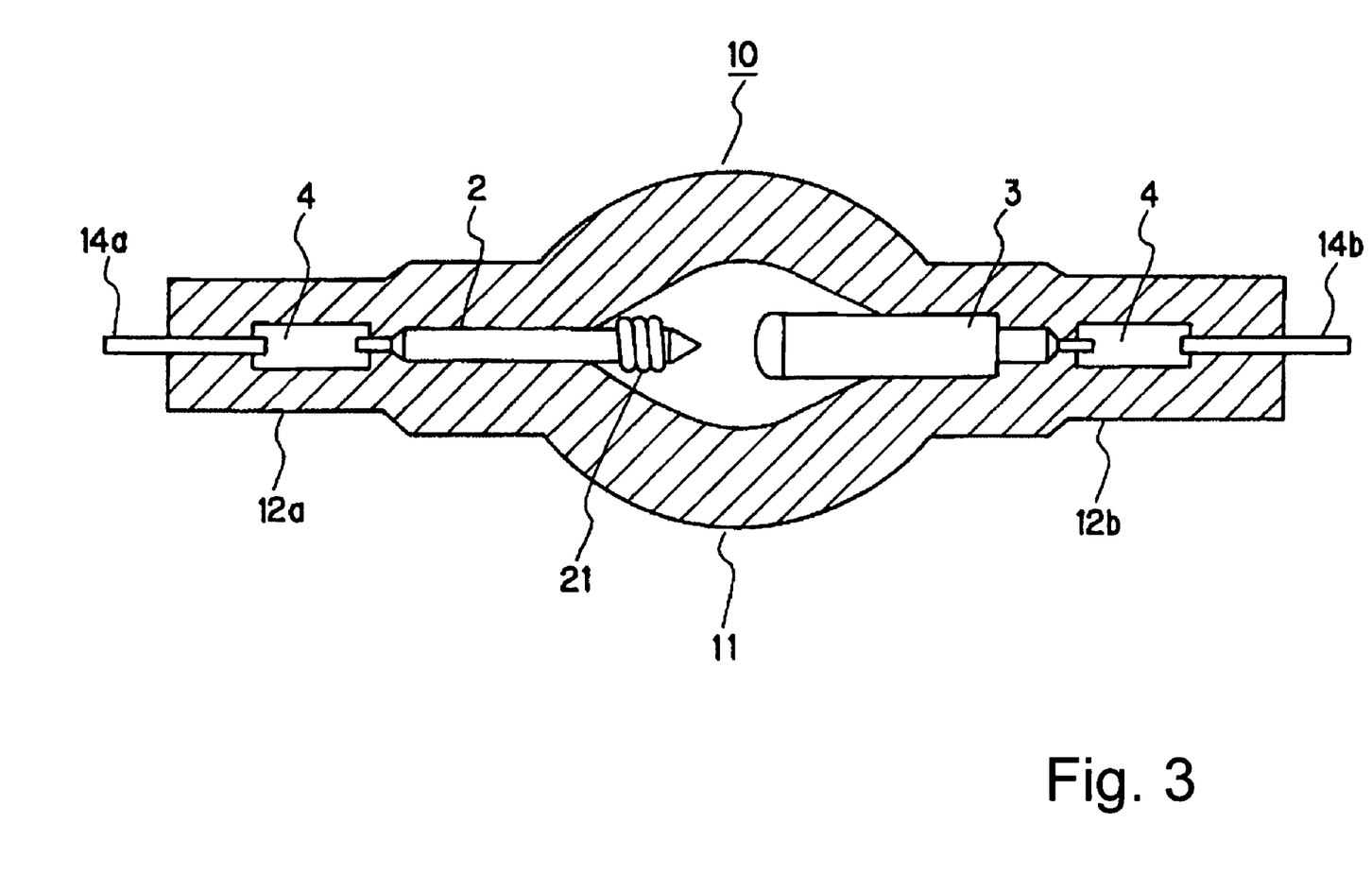
FIG. 3 is a schematic cross-sectional view of a discharge lamp from the light source device of the invention as shown in FIGS. 1 & 2.

FIG. 3 is an enlarged view of the discharge lamp shown in FIGS. 1 & 2. In the light emitting part 11 of the discharge lamp 10, an anode 2 and a cathode 3 are disposed opposite each other. Furthermore, the hermetically sealed portions 12a, 12b are each made such that they extend to the outside from the two ends of the light emitting part 11. In these hermetically sealed portions 12a, 12b, a metal foil (normally of molybdenum) is hermetically installed for electrical conduction, for example, by a shrink seal. Each of the anode 2 and the cathode 3 is connected to one end of a respective metal foil 4. An outer lead 14a or 14b is connected to the other end of the metal foil 4.

The tip of the cathode 2 is wound with a tungsten coil 21. The coil 21 acts as a trigger for operation (position at which start-up takes place) when operation starts due to the unevenness (asperity) effect of the surface. Moreover, the coil 21 has the function of implementing heat radiation after operation due to the asperity effect of the surface and the heat capacity.

The light emitting part 11 is filled with mercury, a rare gas and a halogen gas. The mercury is used to obtain the required wavelength of visible radiation, for example, to obtain radiant light with wavelengths from 360 nm to 780 nm, and is added in an amount of greater than or equal to 0.15 $mg/mm^3$, preferably at least 0.20 $mg/mm^3$, and more preferably at least 0.25 $mg/mm^3$. This added amount does differ depending on the temperature condition. However, during operation a pressure of 150 atm is reached; therefore an extremely high vapor pressure is reached. By adding a larger amount of mercury, a discharge lamp with a high mercury vapor pressure in operation of at least 200 atm or at least 300 atm can be produced. The higher the mercury vapor pressure, the more suitable the light source is for a projector device.

As the rare gas, for example, roughly 13 kPa of argon gas is added, by which the operation starting property is improved.

As the halogen, iodine, bromine, chlorine and the like are added in the form of a compound with mercury or another metal. The amount of halogen added can be chosen, for example, from the range of $10^{-6}$ $\mu mol/mm^3$ to $10^{-2}$ $\mu mol/mm^3$. The halogen is added to prolong the service life using the halogen cycle. It can be imagined that, in an extremely small discharge lamp with a high internal pressure, such as the discharge lamp in accordance with the invention, this addition of the halogen has the effect of preventing damage and devitrification of the discharge vessel.

The numerical values of such a discharge lamp are given by way of example below:

The outside diameter of the light emitting part is selected from the range from 6.0 mm to 15.0 mm and is, for example, 9.5 mm;

The distance between the electrodes is chosen from the range from 0.5 mm to 2.0 mm and is, for example, 1.5 mm;

The inside volume of the arc tube is chosen from the range from 40 $mm^3$ to 300 $mm^3$ and is, for example, 75 $mm^3$;

Under operating conditions, for example, the wall load is chosen from the range from 0.8 $W/mm^2$ to 2.0 $W/mm^2$ and is, for example, 1.5 $W/mm^2$.

Furthermore, the rated voltage is 80 V and the rated wattage is 200 W.

This discharge lamp is installed in a projector device which is as small as possible. Since, on the one hand, the overall arrangement is extremely small, and since, on the other hand, there is a demand for high light intensity, the thermal conditions in the light emitting parts are extremely strict.

The discharge lamp is installed in a projector device or in a presentation apparatus, such as an overhead reflector or the like, and offers radiant light with good color reproduction.

The numerical values of the concave reflector 20 which is shown in FIGS. 1 and 2 are shown by way of example:

The internal volume of the reflection part 22 is chosen from the range from $10^3$ $mm^3$ to $10^6$ $mm^3$ and is, for example, $9 \times 10^4$ $mm^3$;

the opening diameter of the front opening part 23 is chosen from the range from 10 mm to 150 mm and is, for example, 50 mm;

the length from the front opening part 23 to the outer edge of the neck part 21 in the axial direction is chosen from the range from 10 mm to 150 mm and is, for example, 35 mm; and the opening diameter of the top part 21 is selected from the range from 5 mm to 30 mm and is, for example, 10 mm.

Figure 4:
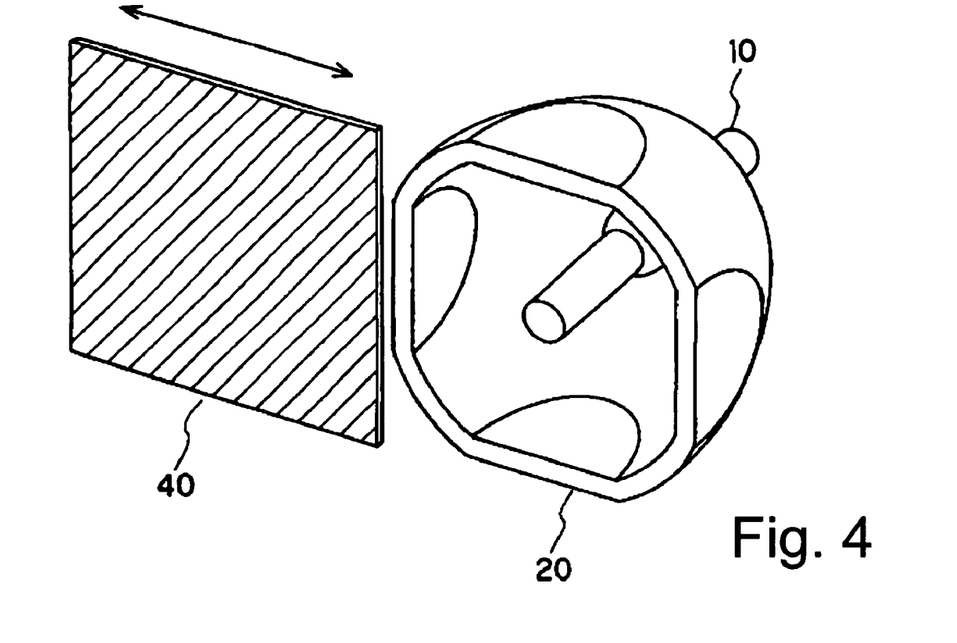
FIG. 4 shows a schematic partial view of the light source device from FIGS. 1 & 2.

FIG. 4 is a schematic perspective of the light source device (including the feed device) which is shown in FIG. 1. If the light source device is used in the economy mode, the reflection heating means 40 slides such that the front opening part of the concave reflector 20 is closed.

The side of the concave reflector 20 is provided with four flat parts. The reason for this lies in the interfitting with other components when the concave reflector 20 is installed in the projector device or in the prevention of roll-off in the arrangement of the reflector during installation efforts or the like. The formation of the four flat parts is not related to the operation of the reflection heating means 40.

Figure 5:
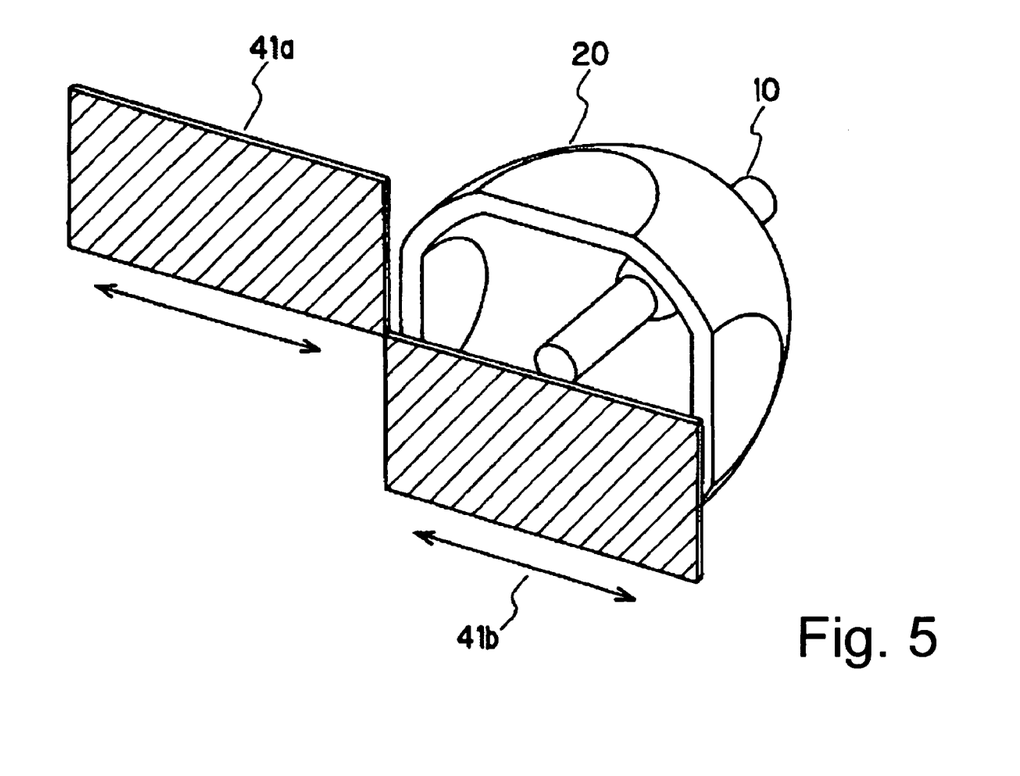
FIG. 5 shows a modification of the light source device of the invention shown in FIG. 4.

FIG. 5 shows a modified version of the FIG. 4 light source device in which the reflection heating means 41 is divided into two parts, specifically into a top part and a bottom part. The top reflection heating means 41a and the bottom reflection heating means 41b can slide independently of one another. In this arrangement, in the case of a small difference between the lamp wattage in the economy mode and the lamp wattage in the steady-state operating mode and in similar cases, only one of the two reflection heating means can be used. There is specifically a projector device of the ceiling suspension type and a projector device of the bottom standing type. According to the respective form of application, locations can be considered which can undergo a temperature increase to a greater extent, and the reflection heating means which is caused to slide can be chosen accordingly.

The number of parts of the reflection heating means is not limited to two, but an arrangement can also be undertaken in which division is done into three or more parts. This arrangement can be advantageous especially in the case in which the economy mode can be set in several levels since precision regulation is possible.

The geometry of the division of the reflection heating means is not limited to the top to bottom direction, but the reflection heating means can also be divided to the left and right. In this case, there are a right reflection heating means and a left reflection heating means.

In the case in which the reflection heating means is divided into an upper and a lower reflection heating means, the direction in which the respective reflection heating means slide is not limited to the direction to the left and right, but an arrangement can be undertaken in which, for example, the top reflection heating means slides down from above the reflector and the bottom reflection heating means slides up from underneath to cover the front opening of the reflector.

The reflection heating means is not limited to a plate-shaped reflection heating means, and for example, it can also have an arrangement in which it opens or can close in the manner of a swirl, as is the case for the lens shutter of a camera. Otherwise, further different forms, such as a combination of the above described arrangements with one another or the like, can be undertaken.

Figure 6A:
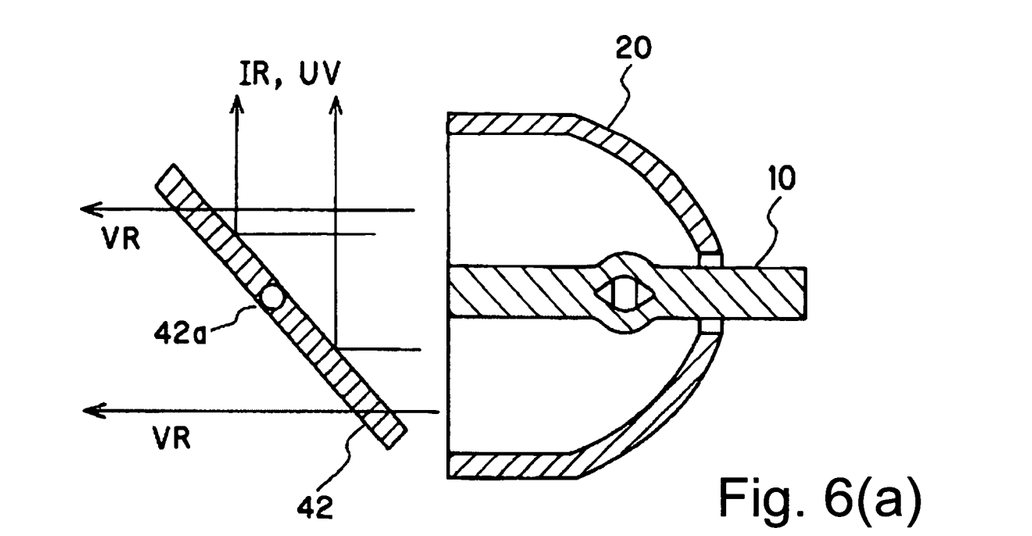
FIGS. 6(a) & 6(b) are schematic cross-sectional views of another light source device in accordance with the invention in different operating modes.
Figure 6B:
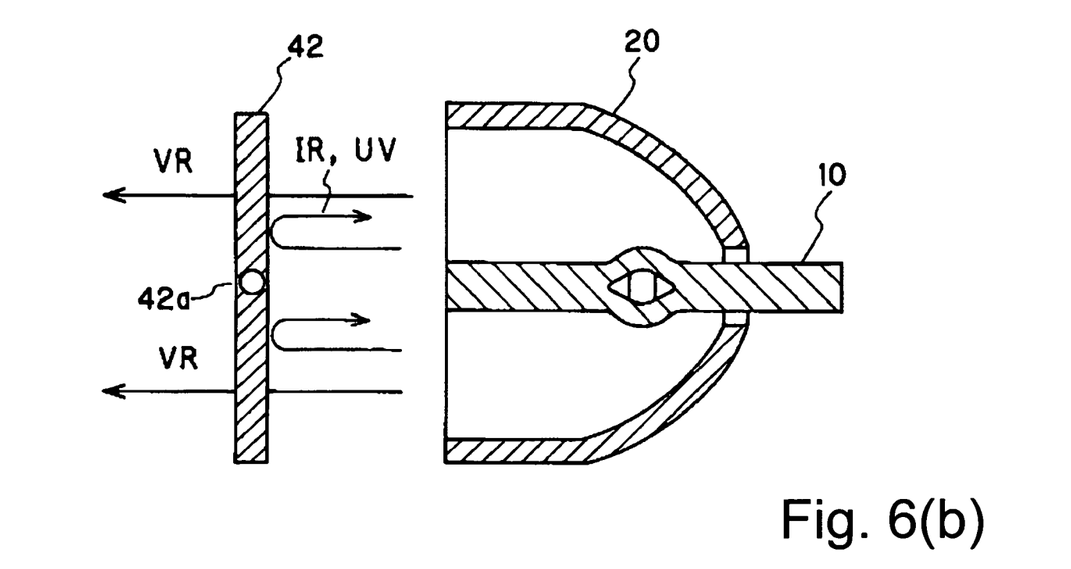

FIGS. 6(a) & 6(b) show another embodiment of the light source device in accordance with the invention. FIG. 6(a) shows the steady-state operating mode and FIG. 6(b) shows the economy mode state. The power supply device, while present, is not shown either in FIG. 6(a) or in FIG. 6(b). Here, only the shape of the reflection heating means is different, while the discharge lamp 10 and the concave reflector 20 are fundamentally identical to those as shown in FIG. 1. Their shapes and the like differ from those as shown in FIG. 1 to a minor extent, but no differences in the functions exist.

In the steady-state operating mode, the reflection heating means (reflection plate) 42 is tilted around an axis of rotation 42a by 45°. For example, a stepping motor or the like can be used for rotation. The reflection heating means 42 is made of a reflection plate which reflects IR light and/or UV radiation. It has the property of transmitting visible radiation and moreover reflecting IR light (IR) or UV radiation (UV). This property is obtained, for example, by forming a multilayer film on a glass plate by vapor deposition.

In the economy mode, the reflection plate 42 is placed perpendicular (at a right angle) to the optical axis of the discharge lamp, by which IR light and UV radiation are reflected with respect to the discharge lamp 10 and radiant heating is accomplished.

The action and the effect by radiant heating of the discharge lamp with IR light and UV radiation are identical to those in the above described embodiments (FIG. 2).

Furthermore, an arrangement is desired in which the reflection plate 42 (one version of the reflection heating means) can be tilted in the range from 0° to 45°. The reason for this is that depending on the angle of tilt the amount of IR light and UV radiation with which radiant heating is to take place can be regulated.

Here, if the reflection plate 42 is inclined at an angle of 45°, as is shown in FIG. 6(a), strictly speaking, the transmission length of the radiant light differs for a multilayer film which has been formed on the reflection plate 42 by vapor deposition in the state shown in FIG. 6(a) from the transmission length in the state shown in FIG. 6(b). Therefore, in the arrangement shown in FIG. (6a), there can also be a case in which, due to the difference of the reflection property between the IR light and the UV radiation, complete reflection as in the drawings cannot occur. However, with respect to the function that, in the steady-state operating mode shown in FIG. 6(a), the discharge lamp is not subjected to radiant heating and that, in the economy mode shown in FIG. 6(b), the discharge lamp is subjected to radiant heating, no disadvantage arises.

Furthermore, in the state in which the reflection plate 42 is tilted, it is desirable that the IR light and the UV radiation which have been reflected in a direction outside the light source device are emitted onto a metal plate which is used only for the purpose of forming a heat storage device or the like. The reason for this lies in not subjecting other devices within the projector device to heating. Furthermore, it is desirable to subject a metal plate which is being used solely for this purpose to forced cooling.

Since in the embodiment shown in FIG. 1, in the steady-state operating mode, the IR light and the UV radiation are emitted together with the visible radiation, a thermal effect and an energy effect can be exerted on different components which are located in front of the concave reflector (such as, for example, an integrator lens, a reflector, a DMD element and the like). In the embodiments shown in FIGS. 6(a) and 6(b), the IR light and UV radiation however deviate from the optical path in which the visible radiation is to propagate. Such a disadvantage can therefore also be eliminated.

Figure 7:
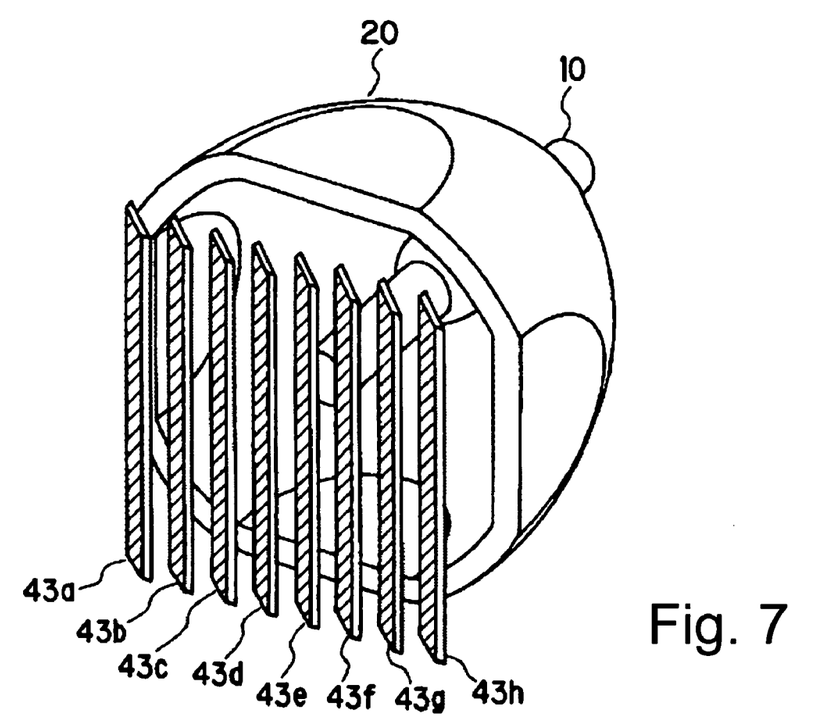
FIG. 7 is a schematic perspective view of another embodiment of a light source device in accordance with the invention.

FIG. 7 shows a modified version of the light source device shown in FIGS. 6(a) & 6(b). The light source device shown in FIG. 6 has only a single reflection plate 42 (reflection heating means) while the light source device shown in FIG. 7 differs in that several reflection plates 43 are used for this purpose. Across the front opening of a concave reflector 20, there are eight reflection plates 43a to 43h arranged in a row. The respective reflection plates can be tilted independently of one another in the range from 0° to 45°.

In the steady-state operating mode, the reflection plates 43a to 43h are positioned such that the front opening of the concave reflector is closed (at a right angle to the radiant light as for the single plate of FIG. 6(b)). On the other hand, in the economy mode the reflection plates 43a to 43h move to an incline of 45° with respect to the radiant light as shown in FIG. 7). In this case, the visible radiation itself is transmitted through the reflection plates 43a to 43h. The visible radiation is itself transmitted without the influence of the inclined angle of the reflection plates 43a to 43h and propagates in a straight line. On the other hand, the UV radiation and/or the IR light in the case of a tilt of the reflection plates 43a to 43h by 45° after reflection by a plate are reflected from the back of a plate which is located next to this plate. As a result, the radiation propagates in a straight line forward, like visible radiation.

The UV radiation and/or the IR light which has been reflected by the plate 43h propagates laterally.

The advantage of this arrangement consists in that the slope space of the reflection plate can be made small. For example, in the case in which the opening diameter of the concave reflector 20 is 50 mm, from the front opening in the direction of the optical axis, extra space of roughly 200 mm is required if only a single reflection plate is used, as in the light source device shown in FIGS. 6(a) & 6(b). On the other hand, this distance is roughly 10 mm in the arrangement shown in FIG. 7.

Here the reflection plates 43a to 43h should have an arrangement in which only one of the plates can be moved selectively into a tilt. Here, there is the advantage that the level with which the discharge lamp is subjected to radiant heating can be regulated. For the reflection plates 43a to 43h it is also possible to change the tilt angle in the range from 0° to 45°. Likewise, there is the advantage that the amount with which the discharge lamp is subjected to radiant heating can be regulated. Furthermore, the reflection plates 43a to 43h can also be tilted by 90°. In this case, the reflection plates are parallel to the optical axis L (see, FIG. 1).

Figure 8:
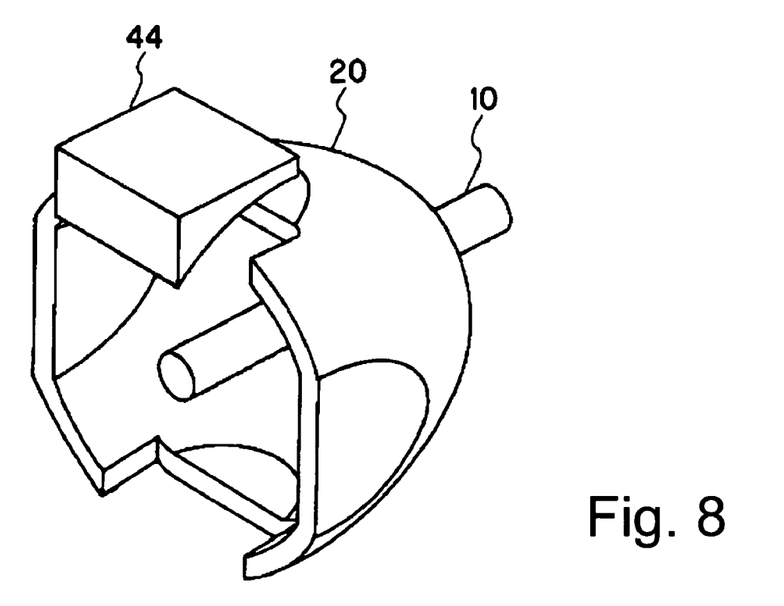
FIG. 8 schematically shows another embodiment of a light source device in accordance with the invention.

FIG. 8 shows another embodiment of the light source device in accordance with the invention. In part of the concave reflector 20 there is a gap in which a reflection part 44 is located and which corresponds to a reflection heating means. The inner surface of the reflection part 44 is provided, by vapor deposition, with a multilayer film which reflects IR light and/or UV radiation. Furthermore, there is a movable device (not shown) which can change the direction of reflection.

In the steady-state operating mode, the arrangement is such that the IR light and/or the UV radiation is not reflected in the direction of the discharge lamp. In the economy mode, the arrangement is such that the IR light and/or the UV radiation is reflected in the direction of the discharge lamp.

It is advantageous that the reflection part 44 is located in the vicinity of the front opening part of the concave reflector 20, as is shown in the drawings. The reason for this is that, especially in a reflector with a small effective opening diameter, the light which is reflected in the vicinity of the front opening part is not used from the beginning. The reflection surface of the reflection part 44 is spherical. The radius of curvature thereof corresponds to a distance L between the middle position of the arc and the reflection surface and is, for example, 0.9 L to 1.1 L.

The form of movement of the reflection part 44 is not especially limited, but an arrangement can also be undertaken in which it is inserted into the gap of the reflector 20 and moves in this way. Furthermore, an arrangement can be undertaken in which the reflection surface of the reflection part 44 is tilted. Mainly the reflection part 44 is subjected to regulation of movement. When there is the function that in the steady-state operating mode the UV radiation and the IR light are reflected onto the discharge lamp, and thus radiant heating takes place, and when there is the function that in the economy mode neither UV radiation nor IR light is reflected onto the discharge lamp, and thus, heating does not take place, this is sufficient.

Figure 9:
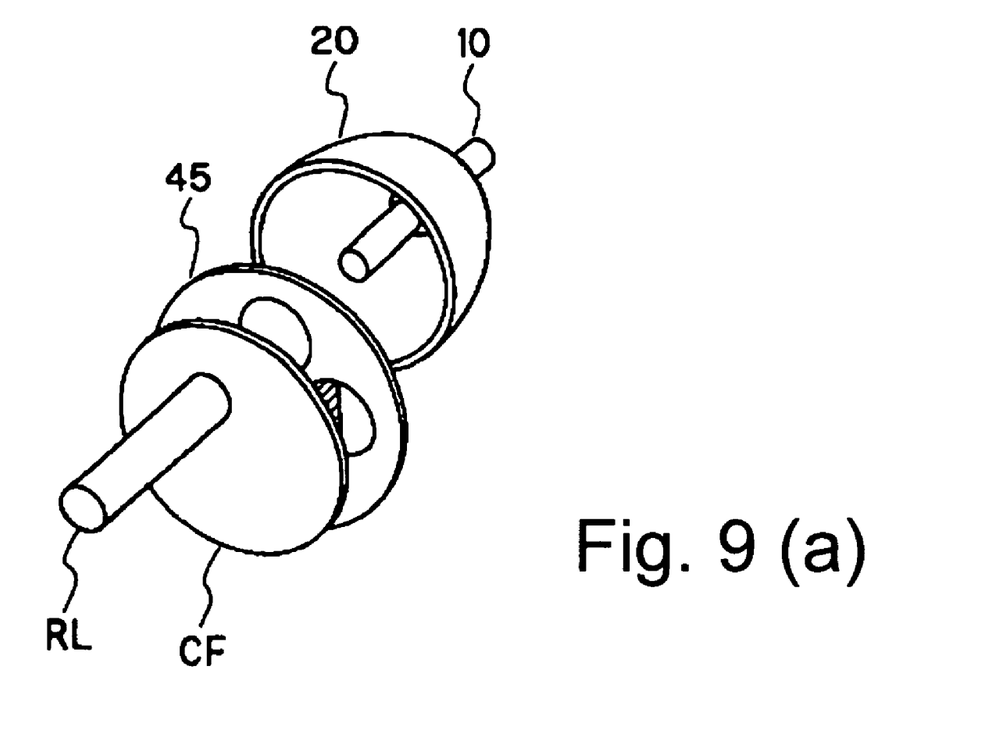
FIG. 9(a) is a schematic view of another embodiment of a light source device according to the invention.
FIG. 9(b) is an enlarged view of the rotary reflection plate from FIG. 9(a)
Figure 9B:
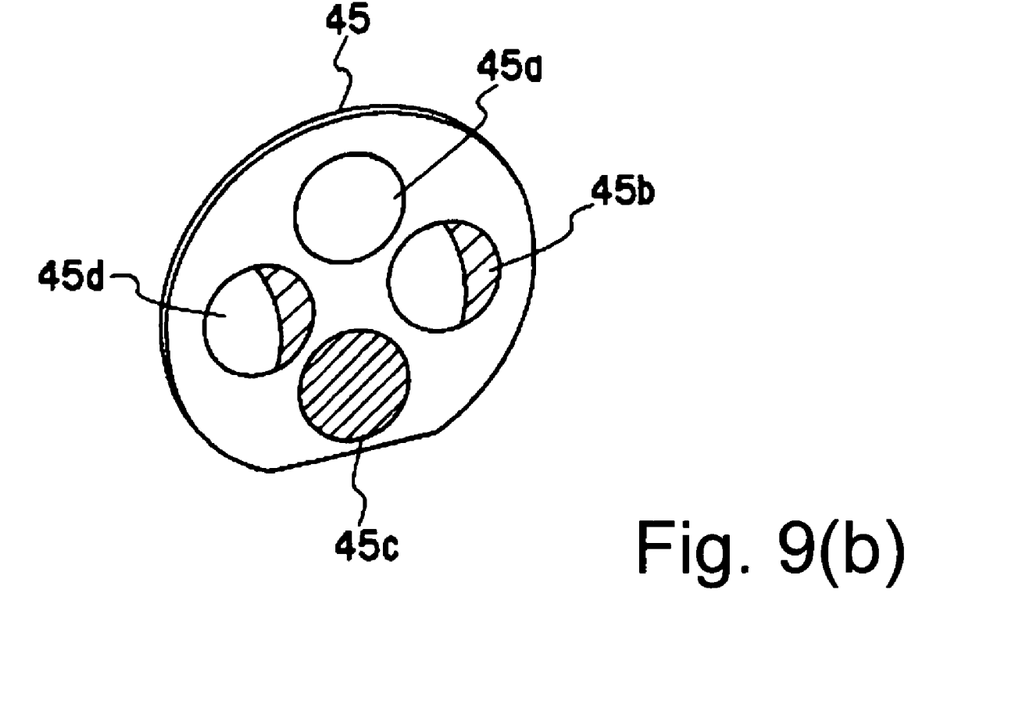

FIGS. 9(a) & 9(b) each show another embodiment of the light source device in accordance with the invention. Here, a light source device is shown which is used for a projector device of the DLP (digital light processor) type. On the front side of the concave reflector 20 there are a color wheel CF and a rod lens RL. In the color wheel, color regions R (red), G (green) and B (blue) are formed. The light reflected from the discharge lamp 10 is focused by reflection by the reflector 20 or as directly projected light via the color wheel CF onto the rod lens RL.

In this embodiment, between the concave reflector 20 and the color wheel CF, there is a rotary reflection plate 45 which corresponds to the reflection heating means. In the reflection plate 45, lenses 45a to 45d are installed. The lenses 45a to 45d each have a spherical arrangement in order to bring the radiant light back to the light emitting part of the discharge lamp 10 with high efficiency. A reflection film is not vapor deposited onto the lens 45a. The lenses 45b and 45d are each only half provided with a film which has been formed by vapor deposition. The whole area of the lens 45c is covered with a film which has been created by vapor deposition. It is not necessary for the lenses 45a to 45d to each have a complete spherical surface, and they may also be made smooth, not spherical, if they can supply the reflection light to the discharge lamp.

In this embodiment, in the steady-state operating mode, the lens 45a of the rotary reflection plate 45 is located in the optical path and the light reflected by the discharge lamp is routed without reflection to the rod lens RL. In the economy mode, the lens 45c of the rotary reflection part 45 is located in the optical path and the IR light and the UV radiation of the light emitted by the discharge lamp are reflected onto the light emitting part of the discharge lamp 10. In this way, the discharge lamp is subjected to radiant heating. Furthermore, by the arrangement of the lenses 45b and 45d in the optical path, part of the IR light and UV radiation can be reflected and the discharge lamp can be subject to radiant heating.

The rotary reflection part 45 is not limited to a plate shape, but can have, for example, a spherical shape in which a reflection film is vapor deposited in part. Primarily, it is sufficient if, in the steady-state operating mode and the economy mode, the reflection functions of UV radiation and IR light can be used differently.

Figure 10:
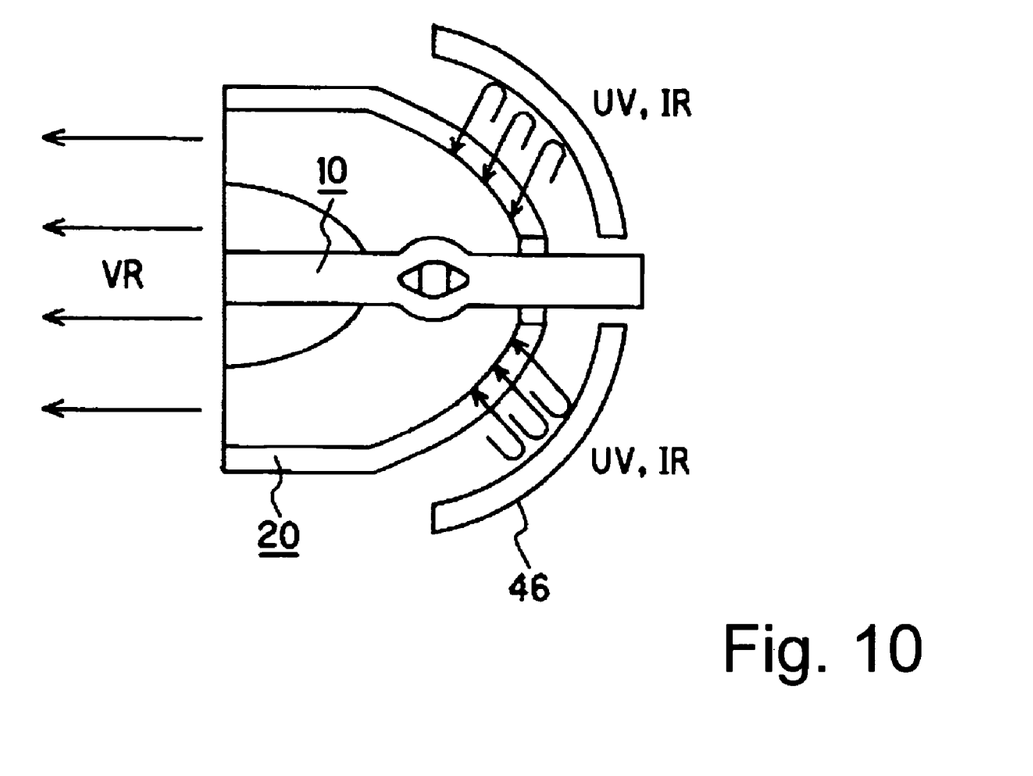
FIG. 10 is a schematic sectional view of another embodiment of a light source device in accordance with the invention and FIG. 11 is a graph showing illumination characteristic of a light source device in accordance with the invention as a function of the length of time.

FIG. 10 shows another embodiment of the light source device in accordance with the invention. Here, on the side of the concave reflector 20, there is an essentially dome-shaped reflection heating component 46. The concave reflector 20 has a base material, such as glass or the like, and has the property that the reflection surface reflects only visible radiation. The heating reflection component 46 reflects the UV radiation and the IR light which have been transmitted by the concave reflector 20. It is designed to reflect the beams which have been transmitted by the concave reflectors 20 such that they are returned to the light emitting part of the discharge lamp 10.

The UV radiation and the IR light which have been transmitted through the concave reflector 20 are returned again to the discharge lamp 10 by this reflection heating means 46. In this way, the discharge lamp 10 can be suitably heated. Furthermore, the reflection heating means 46 is able to change its position and angle according to the operating wattage of the lamp. In the case, for example, of a steady-state operating mode, the reflection heating component 46 is moved to a position away from the concave reflector 20 and is removed, and in the case of the economy mode, it is set to the state which is shown in the drawing. In this embodiment, the form of movement of the reflection heating component 46 is not especially limited either. A method can also be undertaken in which, outside of the reflector 20, the position is changed in a sliding manner. Furthermore, an arrangement can also be undertaken in which, by tilting or the like of the reflection surface of the reflection heating component 46, the reflection property is changed. Mainly, it is sufficient if, by regulating the motion of the reflection heating component 46 in the economy mode, the UV radiation and the IR light are reflected onto the discharge lamp, and thus, heating takes place while, in the steady-state operating mode, the UV radiation and the IR light are not reflected onto the discharge lamp, and thus, heating does not take place.

Here, the discharge lamp 10 normally reaches a stable state after a while following start-up. In the case, for example, of a lamp with 200 W, it takes roughly 250 sec. until stabilization. To shorten this stabilization time, it is also possible in the initial stage of operation of the lamp, regardless of the steady-state operating mode or the economy mode, to use the reflection heating component in such a way that the UV radiation and IR light are returned to the discharge lamp.

This operating use makes it possible to accelerate the rising of the lamp temperature. For example, after reaching the saturation state of the lamp voltage, the reflected amount of radiation is regulated to the amount of radiation which is suitable for the steady-state operating mode and the economy mode by monitoring the lamp voltage.

Figure 11:
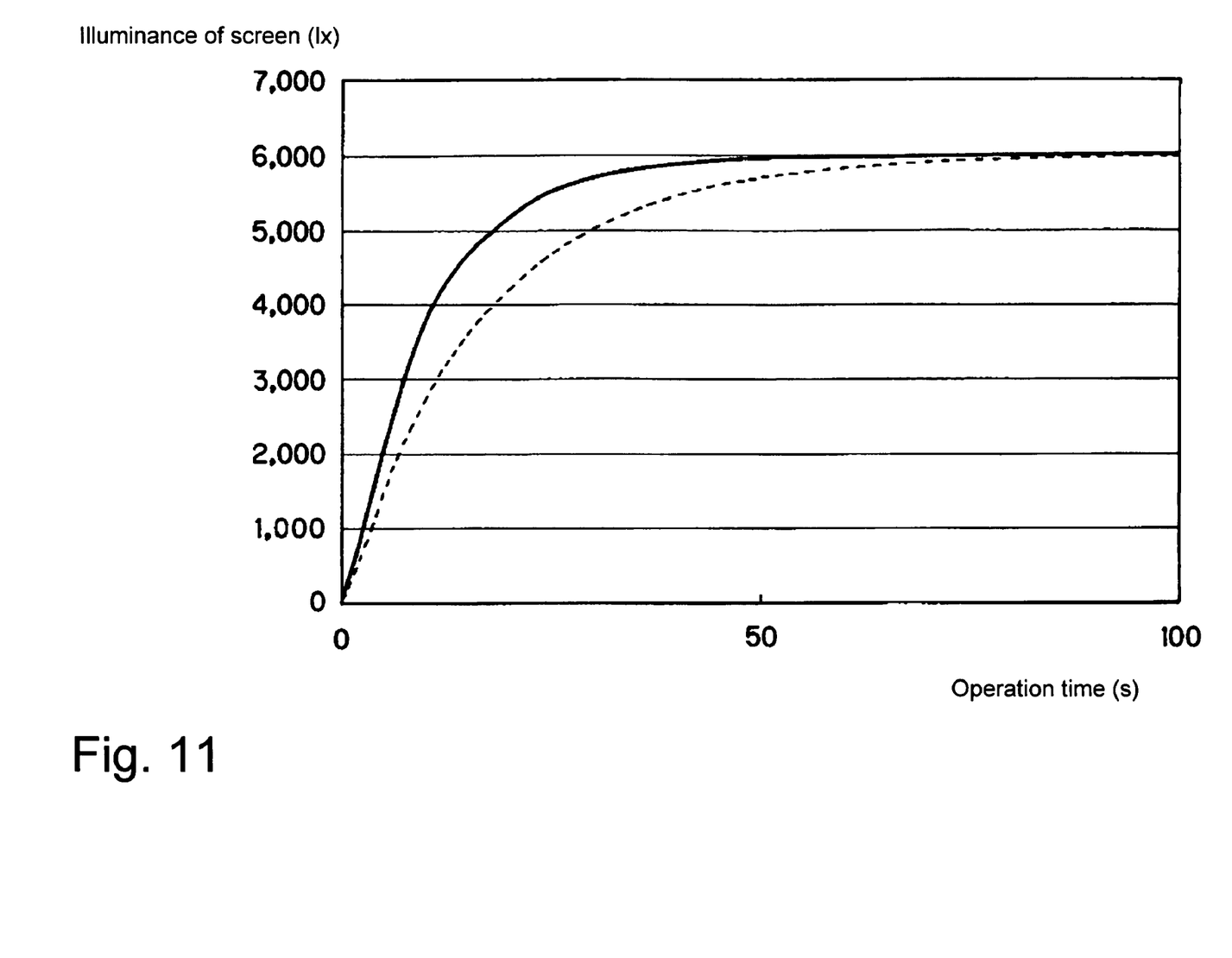

FIG. 11, for example, shows the relation between the duration of operation of the discharge lamp 10 and the illuminance of the screen. Here, the y-axis plots the illuminance (Lx) on the screen which is illuminated by operation of the discharge lamp by a projector device in which this lamp is installed, and the x-axis plots the running time (seconds) of operation of the discharge lamp. The solid line on the graph illustrates the case of an arrangement with use of the reflection heating means and the broken line shows the case in which there is no reflection heating means.

When operation is stabilized by the heating of the discharge, the amount of radiant light and therefore also the illuminance of the screen are stabilized.

FIG. 11 shows that, in the case in which the reflection heating means is not used, the illuminance of the screen 60 seconds after start of operation has stabilized, and by using the reflection heating means the illuminance of the screen has stabilized 45 seconds after the start of operation. This duration in itself can be a numerical value which differs depending on the operating wattage of the discharge lamp and the other conditions. However, it is clear that, under the same conditions, it is effective to install the reflection heating means in the initial stage of operation.

On the other hand, the lamp temperature in a discharge lamp towards the end of the service life can tend to increase due to the effects of devitrification of the discharge vessel and the like. There are, therefore, cases in which use of the reflection heating means has rather an adverse effect in the same manner at the start of operation as during steady-state operation. Therefore, the length of operation and the operating wattage of the discharge lamp can be monitored, and moreover, with consideration of the change of the discharge lamp which occurs over time, the reflection heating means can also be allowed act in a manner such that the above described adverse effect is not exerted.

In the case, for example, of operation of a discharge lamp with a rated wattage of 200 W, normally, roughly after operation of 1000 hours, the devitrification phenomenon of the discharge vessel occurs. Therefore, starting from this time, regardless of the operating mode of the discharge lamp, regulation is carried out in which the reflection heating means is not allowed to act.

Using the above described embodiment, it was described that, in the economy mode, the UV radiation and the IR light are reflected in the direction of the discharge lamp. Here, at least one of the types of radiation, UV radiation and IR light, can be reflected. If only one of the types of radiation is reflected, the reflection of UV radiation in the direction of the discharge lamp has the effects of heating and vaporization of the mercury to a greater extent than in the case of reflection of the IR light.

Furthermore, not only can differentiation be undertaken based on the concepts "steady-state operating mode" and "economy mode", but also division based on the difference of the operating wattage with respect to the discharge lamp can be performed. This means that the following division can also be undertaken:

a case of a change of the action of the reflection heating component according to different operating modes with altered wattages; and the action of the reflection heating component does not change according to fixed wattage modes, but in general according to the change of the operating wattage which is supplied to the discharge lamp.

This means that the matching of the action of the reflection component need not take place according to given stages, but can also be done continuously. "High-wattage operating mode" accordingly means only that, in this case, the wattage is higher than in another state which is called the "low wattage operating mode".

The concave reflector is not limited to an oval reflector, but can also be a parabolic reflector. Furthermore, the concave reflector 20 need not always be made of glass, but can also be made of a metal, such as aluminum or the like, or also of a ceramic, such as aluminum oxide or the like. Furthermore, there can also be a glass cover in the front opening part of the concave reflector 20. The reason for this is that, in an undesirable case of damage to the discharge lamp, the fragments can be prevented from traveling to the outside. In this case, the reflection heating means which is shown in FIGS. 1 & 2 is located on the outer side of the front glass.

Using the above described embodiment, a discharge lamp of the direct current operation type was described. However, the invention can also be applied to a discharge lamp of the alternating current operation type.

For the power supply device, a switching circuit or the like is used for regulating the operation of the discharge lamp. To name one example, an arrangement can be used in which, in the direct current source, there are a chopper circuit, a rectifier smoothing circuit and a starter circuit.

Action of the Invention

As was described above, the feature of the light source device in accordance with the invention lies in using the reflection heating means differently depending on the operating mode. In the high wattage operating mode, the infrared light emitted by the discharge lamp or the UV radiation emitted by the discharge lamp is reflected with lower efficiency than in the low wattage operating mode, and preferably, not at all in the direction of the discharge lamp. Therefore, heating of the discharge lamp can be suppressed. In the low wattage operating mode, because the infrared light emitted from the discharge lamp or the UV radiation emitted from the discharge lamp is returned to the discharge lamp, the discharge lamp can be subjected to radiant heating. Therefore, even when the wattage which is supplied to the discharge lamp from the power supply device is reduced, the mercury can advantageously vaporize. In this way, a low wattage operating mode with a greatly reduced wattage is enabled. For example, an operating wattage with roughly 50% of the steady-state operating mode can be achieved.

What we claim is:

1. Light source device which comprises
a discharge lamp having a silica glass discharge vessel containing a pair of opposed electrodes and at least 0.15 mg/mm$^3$ of mercury;
a concave reflector which surrounds the discharge lamp and which reflects light emitted from the discharge lamp in a given direction through a light exit opening thereof;
a power supply device which is adapted to selectively supply power to the discharge lamp of at least a first wattage and second wattage, the first wattage being higher than the second wattage; and
a reflection heating means, said reflection heating means being adapted to return at least part of the light emitted by the discharge lamp in the direction of the discharge lamp during operation of the discharge lamp with the second lower wattage, and to return less light in the direction of the discharge lamp during operation of the discharge lamp at the higher first wattage than is returned during operation with the second wattage;
wherein the reflection heating means is arranged movably in front of the light exit opening of the concave reflector.

2. Light source device as claimed in claim 1, wherein the reflection heating means is adapted to return essentially no light in the direction of the discharge lamp during operation of the discharge lamp with the first wattage.

3. Light source device as claimed in claim 1, wherein the reflection heating means is adapted to cover the light exit opening of the concave reflector less during operation with the higher, first wattage than during operation with lower, second wattage.

4. Light source device as claimed in claim 3, wherein the reflection heating means is adapted to be removed from the light exist opening for operation with the higher, first wattage and to be placed in front of the light exit opening of the concave reflector for operation with the lower, second wattage.

5. Light source device as claimed in claim 1, wherein the reflection heating means is adapted to be more greatly inclined with respect to the beam path of the light reflected from the concave reflector for operation with the higher, first wattage than for operation with the lower, second wattage.

6. Light source device as claimed in claim 1, wherein the reflection heating means comprises a plurality of reflective components which are each movably mounted.

7. Light source device as claimed in claim 6, wherein the reflective components are movable independently of one another.

8. Light source device as claimed in claim 1, wherein the reflection heating means is pivotably mounted about an axis that is oriented perpendicular with respect to the beam path of the light reflected from the concave reflector through the exit opening.

9. Light source device as claimed in claim 1, wherein the reflection heating means comprises a lens which is provided with a reflection film.

10. Light source device as claimed in claim 9, wherein the reflection heating means has a plurality of lenses which are selectively positionable in the beam path of the light which has been reflected from the concave reflector, the lenses having a reflection film thereon to different extents.

11. Light source device as claimed in claim 1, wherein the reflection heating means is provided with a reflection film that is adapted to return UV radiation and infrared radiation emitted from the discharge lamp to the discharge lamp and to allow visible light to pass therethrough.

12. Light source device as claimed in claim 1, wherein the reflection heating means is adapted to return at least one UV radiation and infrared radiation emitted from the discharge lamp to the discharge lamp.

13. Light source device which comprises
a discharge lamp having a silica glass discharge vessel containing a pair of opposed electrodes and at least 0.15 mg/mm$^3$ of mercury;
a concave reflector which surrounds the discharge lamp and which reflects light emitted from the discharge lamp in a given direction through a light exit opening thereof;
a power supply device which is adapted to selectively supply power to the discharge lamp of at least a first wattage and second wattage, the first wattage being higher than the second wattage; and
a reflection heating means, said reflection heating means being adapted to return at least part of the light emitted by the discharge lamp in the direction of the discharge lamp during operation of the discharge lamp with the second lower wattage, and to return less light in the direction of the discharge lamp during operation of the discharge lamp at the higher first wattage than is returned during operation with the second wattage;
wherein the reflection heating means is located in an area of a neck part at a rear outer side of the concave reflector.

14. Light source device as claimed in claim 13, wherein the reflection heating means is movably arranged with respect to the concave reflector.

15. Light source device which comprises
a discharge lamp having a silica glass discharge vessel containing a pair of opposed electrodes and at least 0.15 mg/mm$^3$ of mercury;
a concave reflector which surrounds the discharge lamp and which reflects light emitted from the discharge lamp in a given direction through a light exit opening thereof;
a power supply device which is adapted to selectively supply power to the discharge lamp of at least a first wattage and second wattage, the first wattage being higher than the second wattage; and
a reflection heating means, said reflection heating means being adapted to return at least part of the light emitted by the discharge lamp in the direction of the discharge lamp during operation of the discharge lamp with the second lower wattage, and to return less light in the direction of the discharge lamp during operation of the discharge lamp at the higher first wattage than is returned during operation with the second wattage;
wherein operation with the lower second wattage is an economy operating mode and operation with the higher first wattage is a steady-state operating mode of the discharge lamp.

* * * * *